Dec. 22, 1964  A. W. THIEL  3,161,915
APPARATUS FOR THE PRODUCTION OF THIN-WALLED PLASTIC ARTICLES
Filed Aug. 24, 1960  15 Sheets—Sheet 1
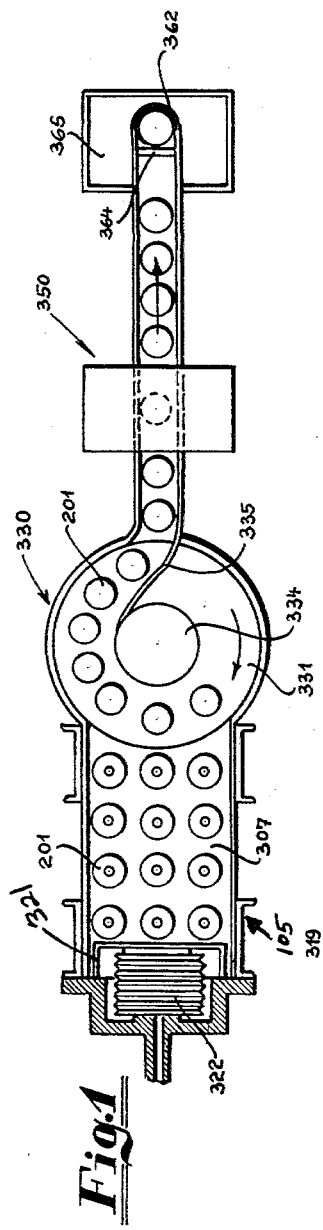
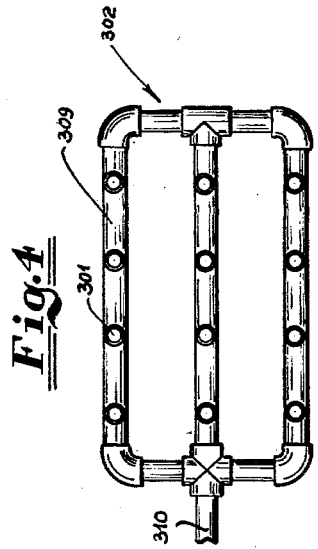
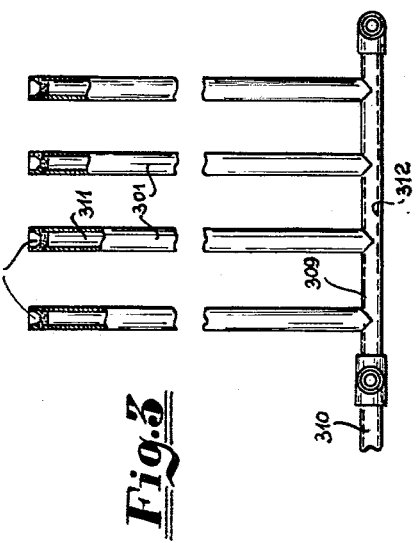
INVENTOR
ALFONS WILHELM THIEL
BY Norris + Bateman
Attorneys

Fig. 2

Dec. 22, 1964  A. W. THIEL  3,161,915
APPARATUS FOR THE PRODUCTION OF THIN-WALLED PLASTIC ARTICLES
Filed Aug. 24, 1960  15 Sheets-Sheet 3
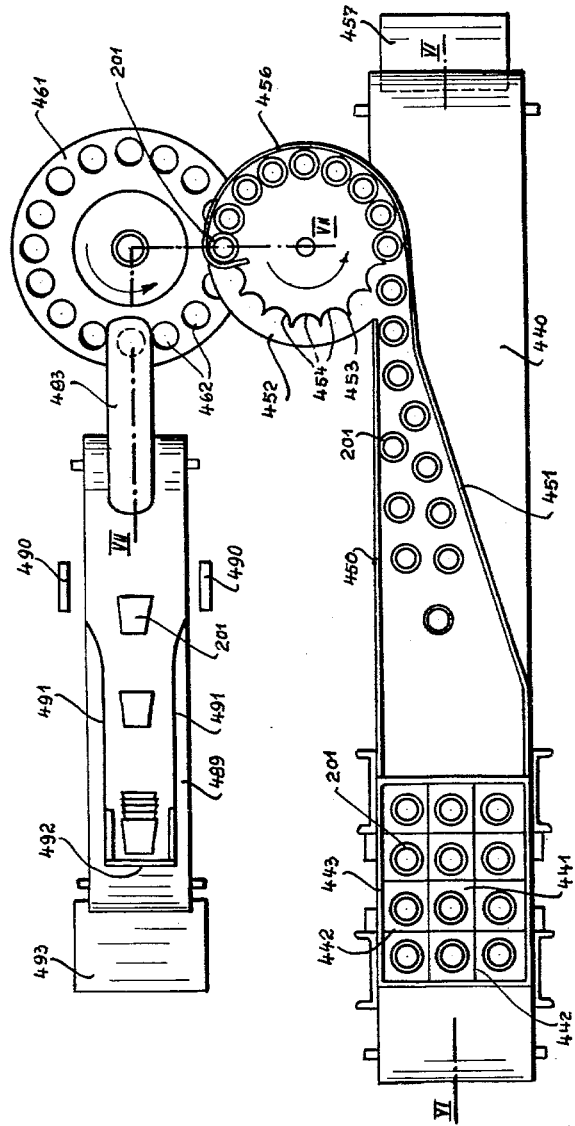
INVENTOR
ALFONS WILHELM THIEL
BY Norris + Bateman
attorneys Dec. 22, 1964   A. W. THIEL   3,161,915
APPARATUS FOR THE PRODUCTION OF THIN-WALLED PLASTIC ARTICLES
Filed Aug. 24, 1960   15 Sheets-Sheet 4
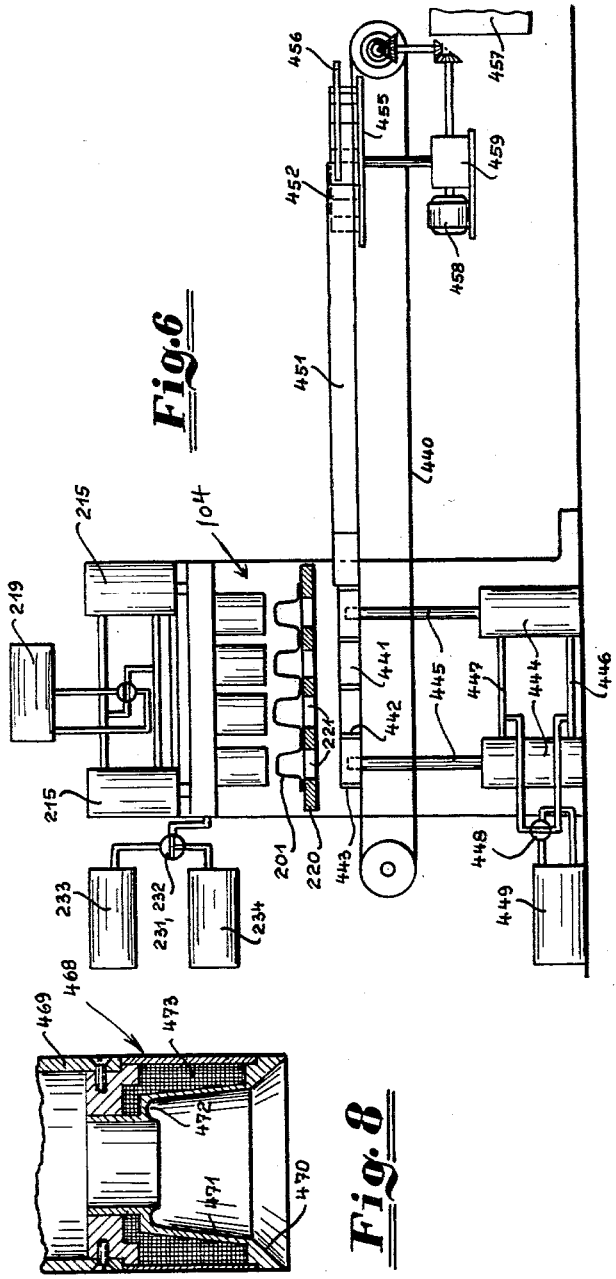
INVENTOR
ALFONS WILHELM THIEL
BY Norris + Bateman
Attorneys Dec. 22, 1964     A. W. THIEL     3,161,915
APPARATUS FOR THE PRODUCTION OF THIN-WALLED PLASTIC ARTICLES
Filed Aug. 24, 1960     15 Sheets-Sheet 5

INVENTOR
ALFONS WILHELM THIEL
BY Norris + Bateman
  attorneys

Dec. 22, 1964 A. W. THIEL 3,161,915
APPARATUS FOR THE PRODUCTION OF THIN-WALLED PLASTIC ARTICLES
Filed Aug. 24, 1960 15 Sheets-Sheet 6

INVENTOR
ALFONS WILHELM THIEL
BY Norris & Bateman
Attorneys

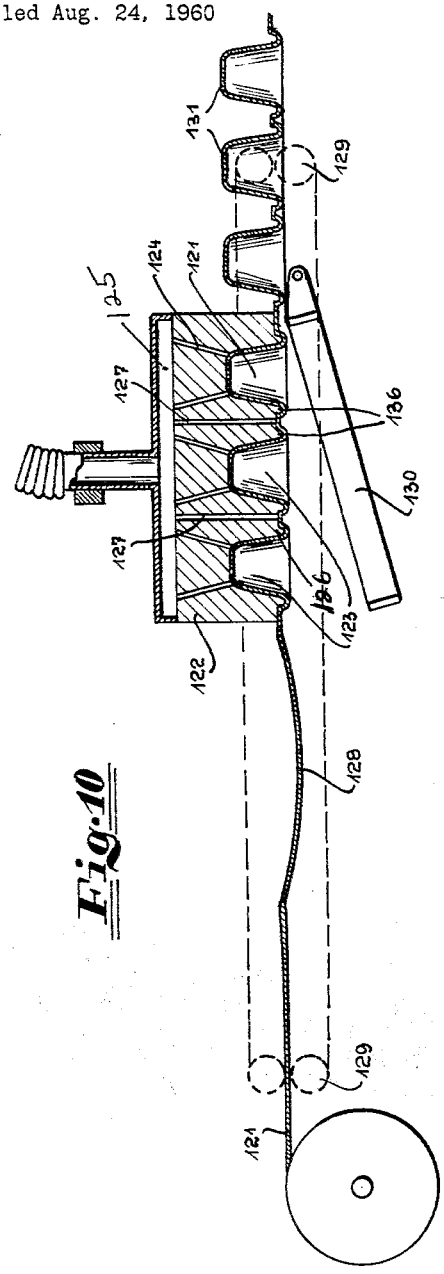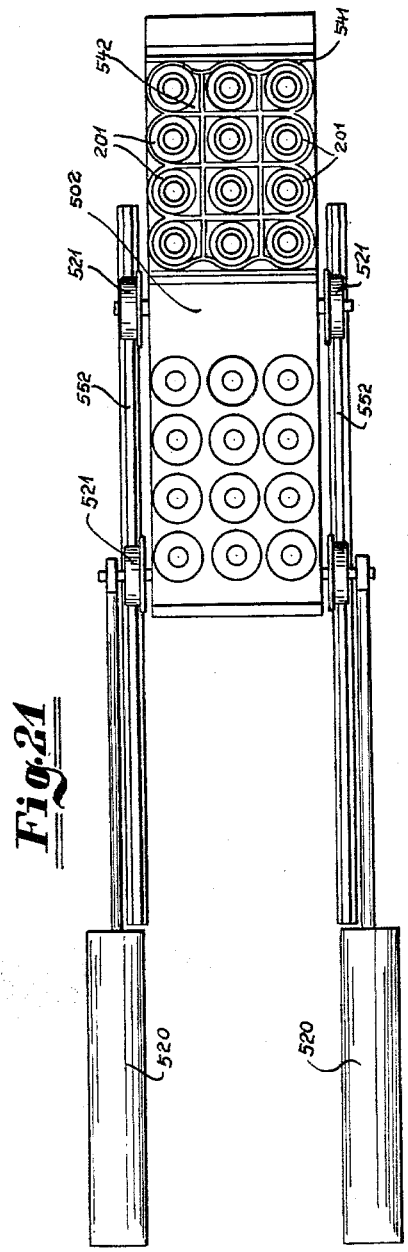

Dec. 22, 1964     A. W. THIEL     3,161,915
APPARATUS FOR THE PRODUCTION OF THIN-WALLED PLASTIC ARTICLES
Filed Aug. 24, 1960     15 Sheets-Sheet 8

INVENTOR.
ALFONS WILHELM THIEL
BY Norris + Bateman
Attorneys

Dec. 22, 1964  A. W. THIEL  3,161,915
APPARATUS FOR THE PRODUCTION OF THIN-WALLED PLASTIC ARTICLES
Filed Aug. 24, 1960  15 Sheets-Sheet 9

INVENTOR
ALFONS WILHELM THIEL
BY Norris & Bateman
Attorneys

Dec. 22, 1964   A. W. THIEL   3,161,915
APPARATUS FOR THE PRODUCTION OF THIN-WALLED PLASTIC ARTICLES
Filed Aug. 24, 1960   15 Sheets-Sheet 10

INVENTOR
ALFONS WILHELM THIEL
BY Norris & Bateman
Attorneys

Dec. 22, 1964  A. W. THIEL  3,161,915
APPARATUS FOR THE PRODUCTION OF THIN-WALLED PLASTIC ARTICLES
Filed Aug. 24, 1960  15 Sheets-Sheet 11

INVENTOR
ALFONS WILHELM THIEL
BY Morris & Bateman
Attorneys

Dec. 22, 1964  A. W. THIEL  3,161,915
APPARATUS FOR THE PRODUCTION OF THIN-WALLED PLASTIC ARTICLES
Filed Aug. 24, 1960  15 Sheets-Sheet 13

INVENTOR
ALFONS WILHELM THIEL
BY Norris + Bateman
Attorneys

Dec. 22, 1964   A. W. THIEL   3,161,915
APPARATUS FOR THE PRODUCTION OF THIN-WALLED PLASTIC ARTICLES
Filed Aug. 24, 1960   15 Sheets-Sheet 14

INVENTOR
ALFONS WILHELM THIEL
BY Norris + Bateman
    attorneys

Dec. 22, 1964  A. W. THIEL  3,161,915
APPARATUS FOR THE PRODUCTION OF THIN-WALLED PLASTIC ARTICLES
Filed Aug. 24, 1960  15 Sheets-Sheet 15

INVENTOR
ALFONS WILHELM THIEL
BY Norris & Bateman
Attorneys 3,161,915
APPARATUS FOR THE PRODUCTION OF THIN-
        WALLED PLASTIC ARTICLES
Alfons Wilhelm Thiel, 11 Raimundistrasse,
              Mainz, Germany
       Filed Aug. 24, 1960, Ser. No. 51,669
Claims priority, application Germany, Nov. 8, 1957,
  T 14,382, T 14,383, T 14,384; Aug. 31, 1959, T 17,-
  146; Nov. 3, 1959, T 17,421
              21 Claims. (18—19)

The invention relates to apparatus for the production of thin-walled plastic articles and particularly those having a beaded edge, more particularly in the form of an edge bead of substantially circular cross-section, by deep-drawing thermoplastic or like material in foil or strip form.

This application is a continuation-in-part of applicant's copending parent application Serial No. 771,864 filed November 4, 1958, now matured into United States Letters Patent No. 3,115,677 dated December 31, 1963.

In that parent application there is disclosed an overall apparatus and process wherein a series of operations comprising preheating, shaping, cooling and punching the pieces from a strip or band of plastic material is carried out as each length of the strip is moved stepwise through the apparatus. In that process and apparatus the thermoplastic strip is fed into one end of the apparatus, and the finished workpieces are continuously collected and extracted at the other end.

The parent application, more specifically discloses an apparatus wherein there is arranged in succession a strip pre-heating station, a shaping station, a cooling path, a punching out station, and a device for collecting and forwarding the punched out shaped workpieces. In the shaping station a shaping tool adapted for deep drawing deformation work is displaceable vertically with respect to the preheated strip being formed, and it acts to deep draw and shape the band so that the shaped pieces are formed integrally in the thermoplastic strip. The present invention includes other embodiments and improvements in this direction.

After shaping the band with the shaped workpieces therein is drawn through a special cooling path which is of a length approximately equal to one feed step through the shaping station, but the cooling path may be shorter by about 0.5% to 1.0%. This cooling path is of adjustable length.

In the present invention the preheating station apparatus, the subsequent shaping station apparatus, the cooling station, and the associated process steps acting on the thermoplastic strip, are preferably exactly as disclosed in said Serial No. 771,864 (Patent No. 3,115,-677) for many aspects of the present invention, and the invention herein is directed mainly to the apparatus according to said aplication and certain variations thereof herein disclosed in detail whereby to specially shape and punch out the shaped workpieces from the strip with externally peripherally curved rims thereon.

In the present invention special shaping structure steps will be described for the automatic and accurate forming of workpieces wherein the rims are externally and reversely curved, or beaded over, as well as associated punching and carry away arrangements.

The present invention also includes a novel association of the shaping, punching and conveying apparatus for high speed continuous automatic production and collection of articles formed from relatively thin sheets of material which becomes deformable when heated.

To form beaded-over edges in thick-walled cylindrical workpieces made of a thermoplastic material, such edges being of circular cross-section, it is already known to introduce the cylindrical parts by their terminal edges into a heated shaping tool which uses the lengthwise pressure applied to the workpiece to bead over the terminal edge thereof. This step can be used on thick-walled cylindrical articles but it is of no use for articles of any other shape, because lengthwise pressure applied to the article would rather tend to compress the same than to bead the edge thereof.

To enable workpieces of any shape and of reduced wall thickness to be given a beaded edge of clean appearance and circular cross-section, the invention proposes apparatus wherein that edge of the workpiece which it is required to bend is as far as possible prepared and bent while the workpiece is being shaped and remains integral with the strip, and is cut to size in preparation for being beaded over when the workpiece is cut out of the said strip, and the prepared and bent-over part of the edge is placed on a thrust surface as abutment for beading over the still untreated but cut-to-shape part of the edge.

The invention prevents any force being applied to the workpiece while the edge is being beaded over. The beading step can therefore be carried out on workpieces of any shape rapidly and without any risk of damage.

The actual beading-over step can be performed in any way compatible with the material of which the workpiece is made. Very advantageously, the still untreated but cut-to-shape part of the edge may be beaded over by a stamping step with heating. According to one very advantageous embodiment of the invention, the preparation and bending-over of the workpiece edge is performed during the shaping of the workpiece in a vacuum deep drawing step in which a shaping tool descends upon a heated strip of material, the same sagging after the fashion of a sack. Conveniently, when extenders are used, an air cushion is formed, during workpiece shaping, between the heated sagging strip of plastic and the shaping tool, and the extenders, together with the workpiece-forming parts of said plastic strip, are advanced into such air cushion and into the mould cavities only to such an extent that the plastic strip remains out of engagement with those parts of the shaping tool which prepare and bend the edge parts of the workpiece. Advantageously, while the workpiece is being shaped, those regions of the strip of material which will subsequently form the edge parts of the workpiece are pressed against the bottom surface of the shaping tool, for instance, by compressed air.

The continuous production of workpieces having a beaded edge can be performed more particularly by an apparatus in which an evacuable shaping tool is provided which can be lowered onto the heated sagging strip of material and which comprises, on the edge of its shaping cavities, projecting shaping parts for that part of the workpiece edge which it is required to prepare, and this shaping device is followed by a punching-out device in which at least one adjusting elment is associated with each of the blades cutting workpieces out of the plastic strip and cutting the untreated edge parts to shape, such adjusting elements engaging into the prepared part of the workpiece edge and releasing the punching knife only when the workpiece and the prepared edge part has been accurately aligned relatively to said knife, and means for receiving the punched-out workpieces and for placing the same on the thrust surface following the punching device. Advantageously, to facilitate the removal of the shaped strip of material from the shaping tool, and more particularly to facilitate the pulling away of the preshaped edge parts from the shaping tool, an ejector plate is mounted in the shaping tool for vertical movement relatively thereto and is depressed by spring means. The cutting of the untreated edge part exactly to shape can be performed by various designs of the punching device which follows the shaping device. For instance, in one particular design of punching device, each punching knife is associated with an aligning sleeve which is applied to the workpiece surface and which is keyed thereto and which comprises an edge part, the same being engageable in the prepared part of the workpiece edge and, by its width, determining the cut-to-shaped width of the untreated part of the workpiece edge. In another possible embodiment of a punching device, for instance, each punching knife comprises a wedge-shaped surface which is applied to the workpiece surface and which is keyed thereto and which is drawn out to form an edge part beyond the cutting edge of the punching knife, such edge part being engageable in the prepared part of the workpiece edge and, by its width, determining the cut-to-shaped width of the untreated part of the workpiece edge.

As apparatus for the production of a completely round edge on thin-walled workpieces, more particularly drinking cups, prepared by vacuum deep-drawing, there is suitable more particularly an apparatus wherein the thrust surface for the prepared part of the workpiece edge comprises a trestle which bears the workpiece and which may or may not provide subsequent shaping of the semi-circular edge part following the workpiece wall, and the stamping tool comprises a ram which is adapted to move relatively to the workpiece and to the trestle and which bends the workpiece outer edge—i.e., the untreated edge part of the workpiece—in the opposite direction to such relative movement. This stamping device can be used for continuous workpiece production. Alternatively, it can be used for the subsequent production of a completely round edge on the workpieces where the previous treatment which the same has had is substantially as in the process according to the invention. The characteristic feature of such treatment is that the workpiece comprises a prepared edge part which follows the workpiece wall and which is continued outwards by a still untreated but cut-to-shape edge part.

Preferably, in the stamping device according to the invention, where the ram engages around the workpiece, the inner operative surface of the ram is subdivided into a conical entry zone, a slightly concial guiding zone which follows the entry zone, and a shaping zone which corresponds to the required edge shape and which follows the guiding zone. The operative surface of the ram is heated at least in the guiding zone and in the shaping zone. In one embodiment of the stamping device according to the invention, which can readily be included in the production line but which can, if required, be very satisfactorily used for subsequent treatment of the workpieces, a row of workpiece-receiving trestles can be placed in a ring on a rotating tray, and a corresponding number of rams can be provided above the tray, the rams co-rotating with the trestles but being adapted to be moved vertically, for instance, by means of a rollway. Conveniently, to associated this design of the stamping device with a punching device which cuts a number of shaped workpieces simultaneously from a strip of material in a single step, means which receive the workpieces and which place the same individually on the trestles are interposed between the punching device and the trestle-bearing rotating tray. For instance, the tray can be associated with compressed air blowing devices which are adapted to place the workpieces on the trestles and to blow the finish-treated workpieces off the trestles.

In another embodiment of the stamping device according to the invention, which can very readily be directly incorporated in the production line, the trestles are disposed in groups on a rotating dished member and there is provided for all the trestle groups a common group of rams which all the groups of trestles pass by seriatim. Conveniently, each trestle group is adapted in trestle arrangement to the arrangement of the knives in a punching device for simultaneously punching out a plurality of workpieces, and the rotating dished member so extends below the base of the punching device that the punched-out workpieces pass directly to the treatles through apertures in the base of the punching device. To ensure that the workpieces are placed on the trestles reliably and accurately, lengthwise movable sucking and guiding fingers extend vertically upwards through the trestles and are moved to their highest position to pick up the workpieces and place the same on the trestles and are then lowered from such position. Guiding fingers which extend upwards through the trestles are provided to lift the finished workpieces off the trestles and transfer them to further conveying means.

Advantageously, further conveying means comprise a porous plate which can be moved alternately over that group of trestles and that conveying belt which bear the finish-treated workpieces, such plate being connected to a chamber which is emptied at intervals.

It is a major object of the invention to provide a novel apparatus for punching and handling shaped articles wherein punching mechanism for cutting a plurality of the shaped articles from a sheet of plastic material is disposed in novel association with arrangements for conveying away and otherwise handling the articles.

A further important object of the invention is to provide a novel apparatus for shaping articles in a preheated length of plastic material, punching the articles out of the strip and forming beaded peripheral edge rims on the articles.

It is a further major object of the present invention to provide a novel apparatus for the production of groups of articles, such as cups, from thin-walled plastic material wherein the articles are automatically shaped with definite preliminary rim structure in a preheated length of sheet plastic material.

A further related object of the invention is to provide novel apparatus for cutting the shaped articles from the material.

A further object of the invention is to provide a novel apparatus wherein groups of articles are shaped in and punched out of a length of thin heated plastic sheet material followed by another shaping operation to attain a definite rim formation.

A further object of the invention is to provide a novel apparatus for shaping articles in a length of thin plastic material wherein the material heated to sagging condition is mechanically and subsequently by vacuum deformed in special apparatus.

It is a further object of the invention to provide a punching apparatus for shaped articles embodying novel ejection mechanism.

A further object of the invention is to provide a punching apparatus for cutting shaped articles from a sheet of plastic material embodying novel knife structure and mode of operation.

Further objects will appear as the description proceeds in connection with the appended claims and the annexed drawings wherein:

FIGURES 1 and 2 are, respectively, a plan view and a diagrammatic elevation, partly in section, showing the means for collecting and forwarding the punched-out shaped workpieces;

FIGURES 3 and 4 show details of the device for collecting the punched-out shaped workpieces;

FIGURE 5 is a plan view showing modified means for collecting and forwarding the punched-out shaped workpieces;

FIGURE 6 is a diagrammatic elevation partly in section taken on line VI—VI;

FIGURE 7 is a diagrammatic elevation in section taken on line VII—VII of FIGURE 5;

FIGURE 8 is a sectional elevation of a detail of FIGURE 7;

Figure 9:
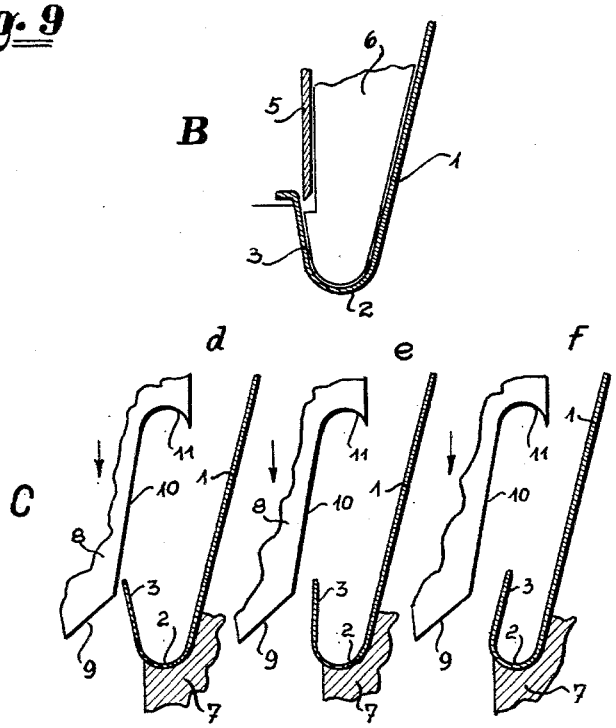
Figure 11:
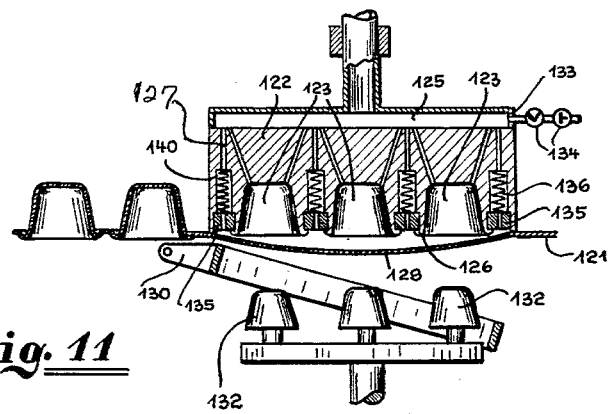
Figure 12:
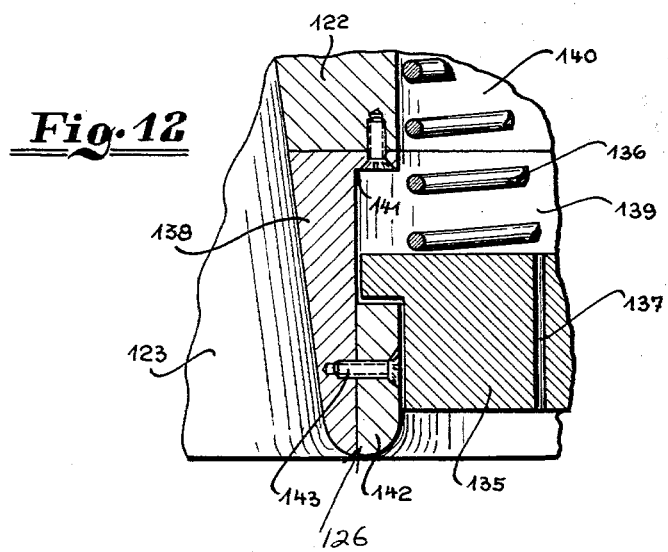
Figure 15:
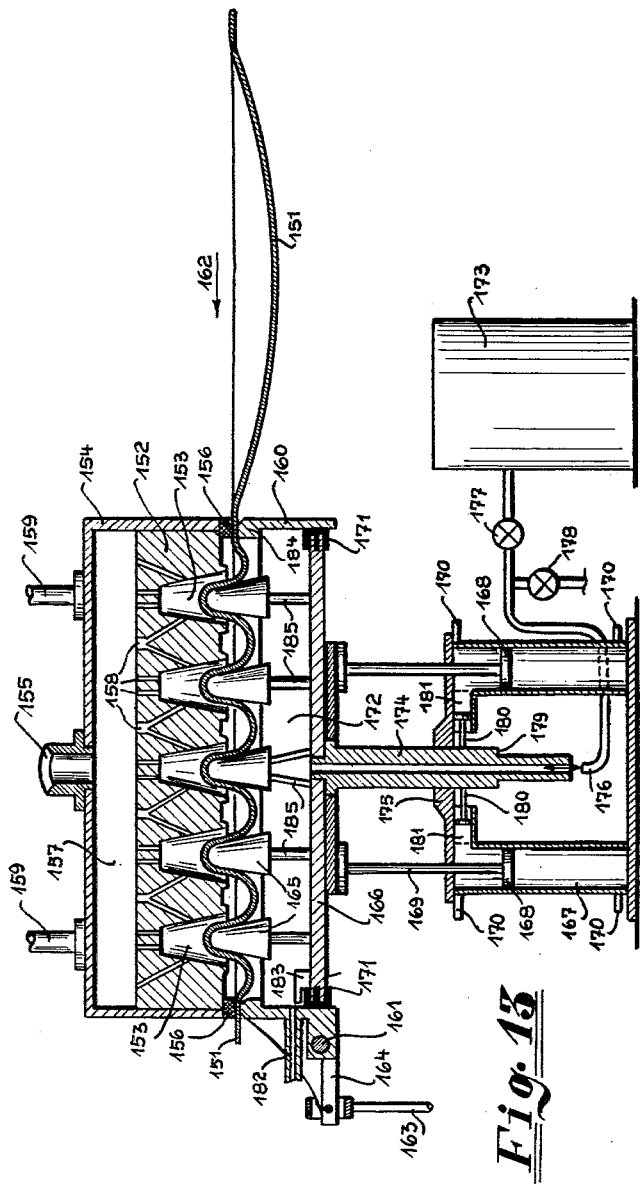
Figure 14:
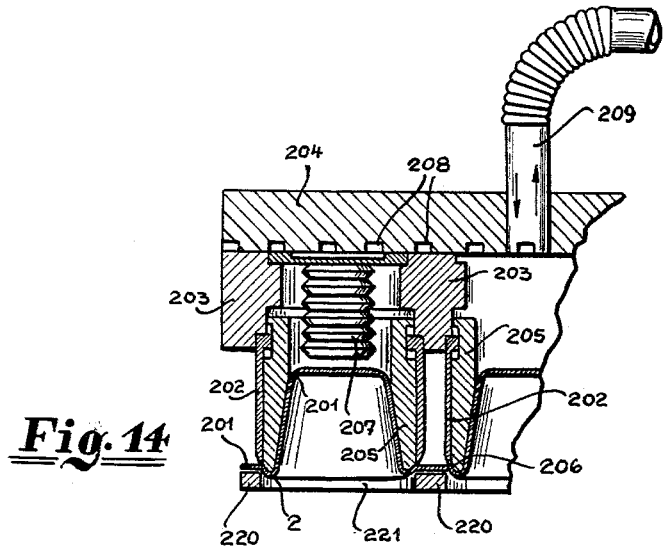
Figure 15:
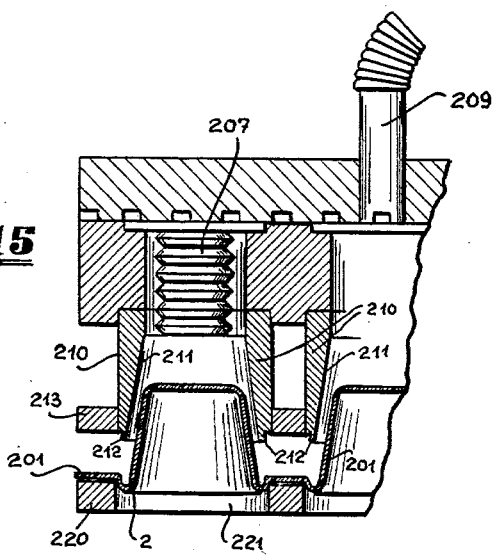
Figure 16:
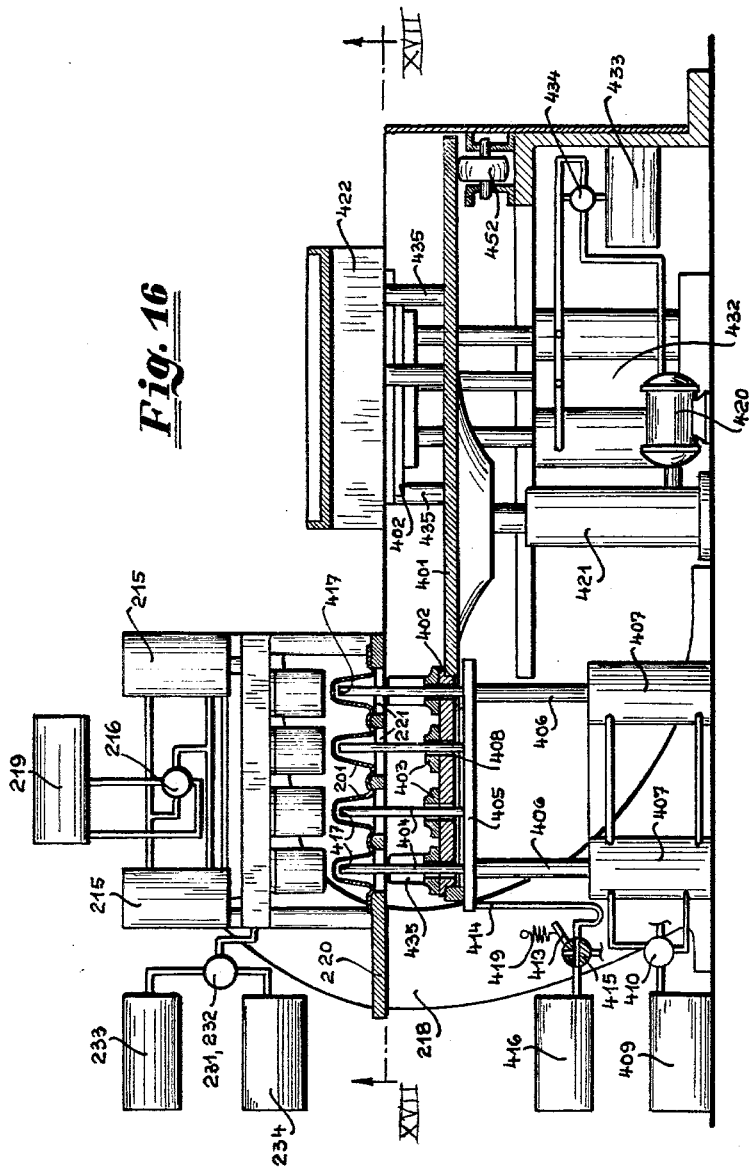
Figure 17:
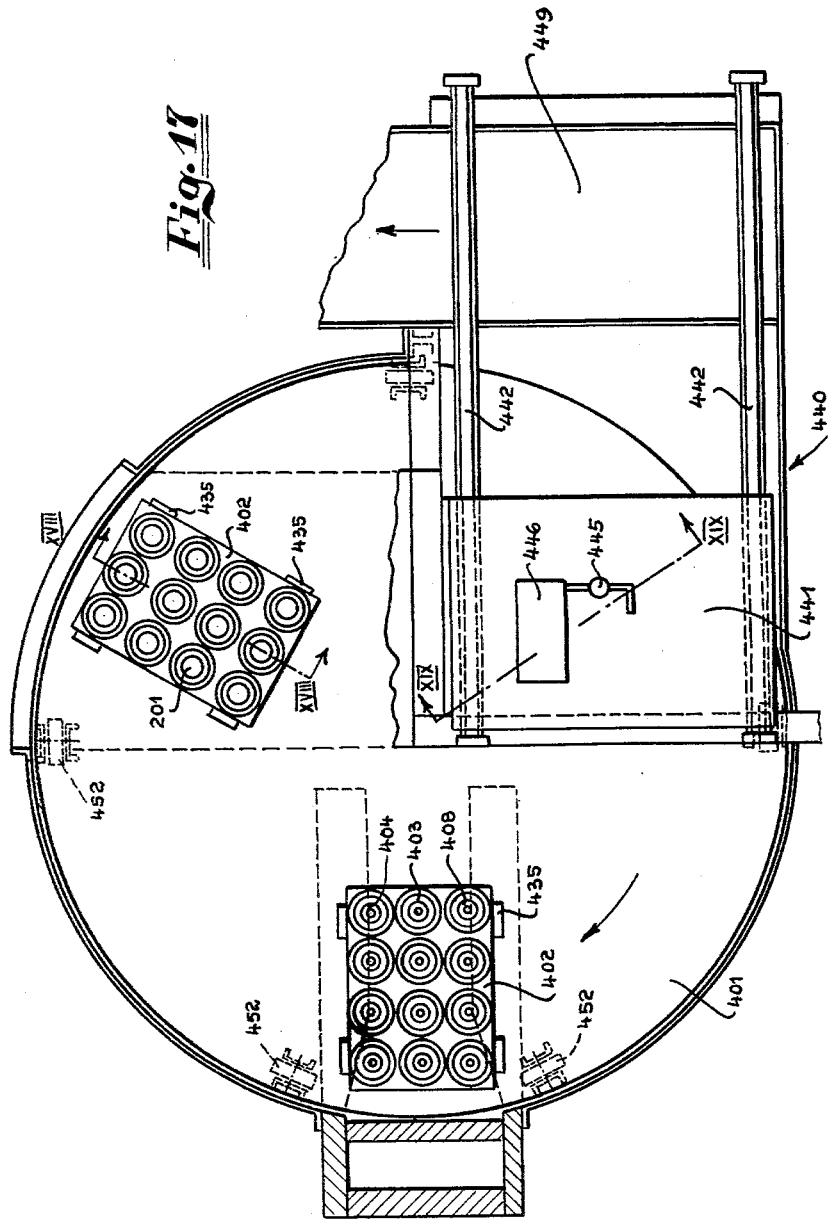
Figure 18:
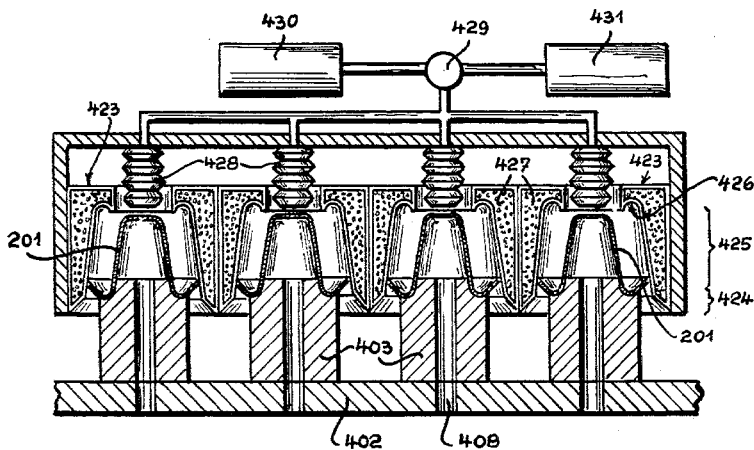
Figure 19:
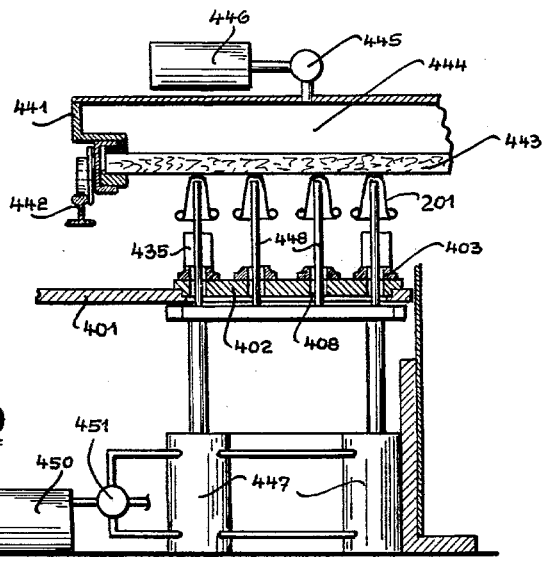
Figure 20:
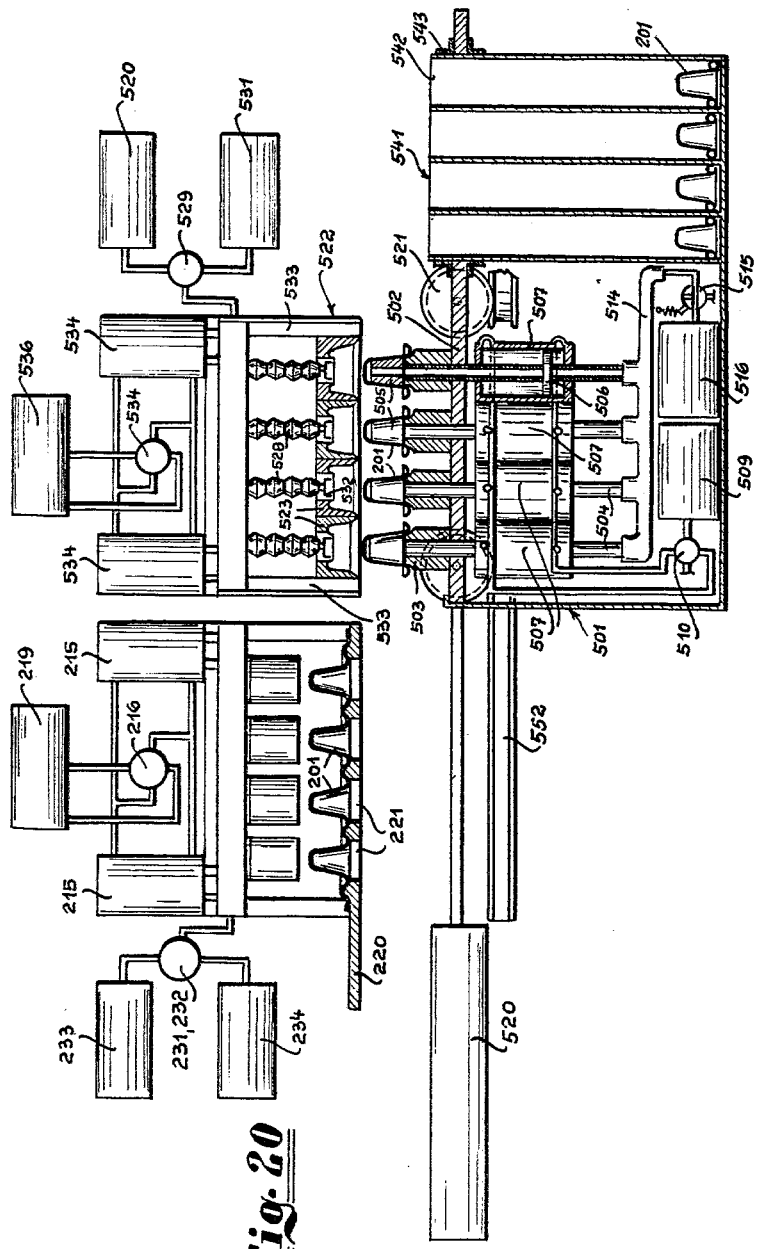

FIGURE 9 diagrammatically illustrates how the workpieces are evolved in the process according to the invention;

FIGURE 10 is a sectional elevation of a shaping device;

FIGURE 11 is a sectional elevation of a modified shaping device;

FIGURE 12 is an enlarged sectional elevation of a part of FIGURE 11;

FIGURE 13 is a sectional elevation of another form of shaping device;

FIGURES 14 and 15 are sectional and rather diagrammatic elevations of two forms of a punching device;

FIGURE 16 is an elevation, partly in section, of another form of punching or stamping device;

FIGURE 17 is a plan view, partly in section, on the line XVII—XVII of FIGURE 16;

FIGURE 18 is an enlarged sectional elevation, on the line XVIII—XVIII of FIGURE 17;

FIGURE 19 is a sectional elevation, on the line XIX—XIX of FIGURE 17;

FIGURE 20 is an elevation, partly in section, of a further form of punching or stamping device;

FIGURE 21 is a plan view of part of FIGURE 20; and

Figure 22:
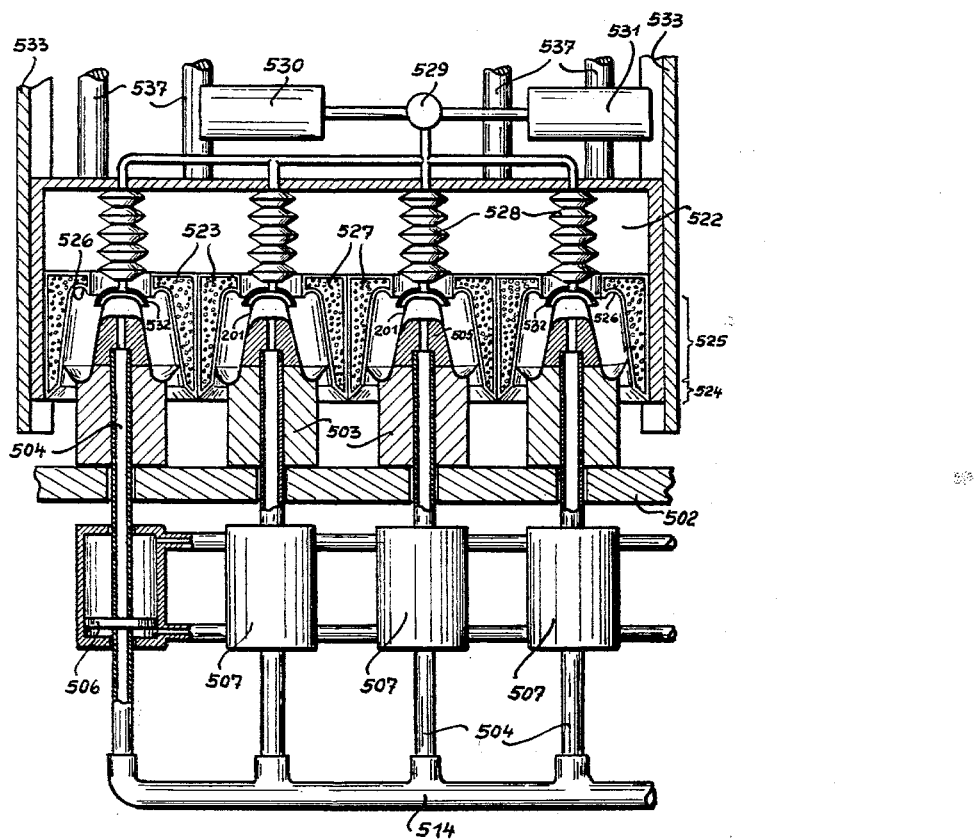

FIGURE 22 is a sectional elevation, on a larger scale, of part of FIGURE 20.

Figure 2:
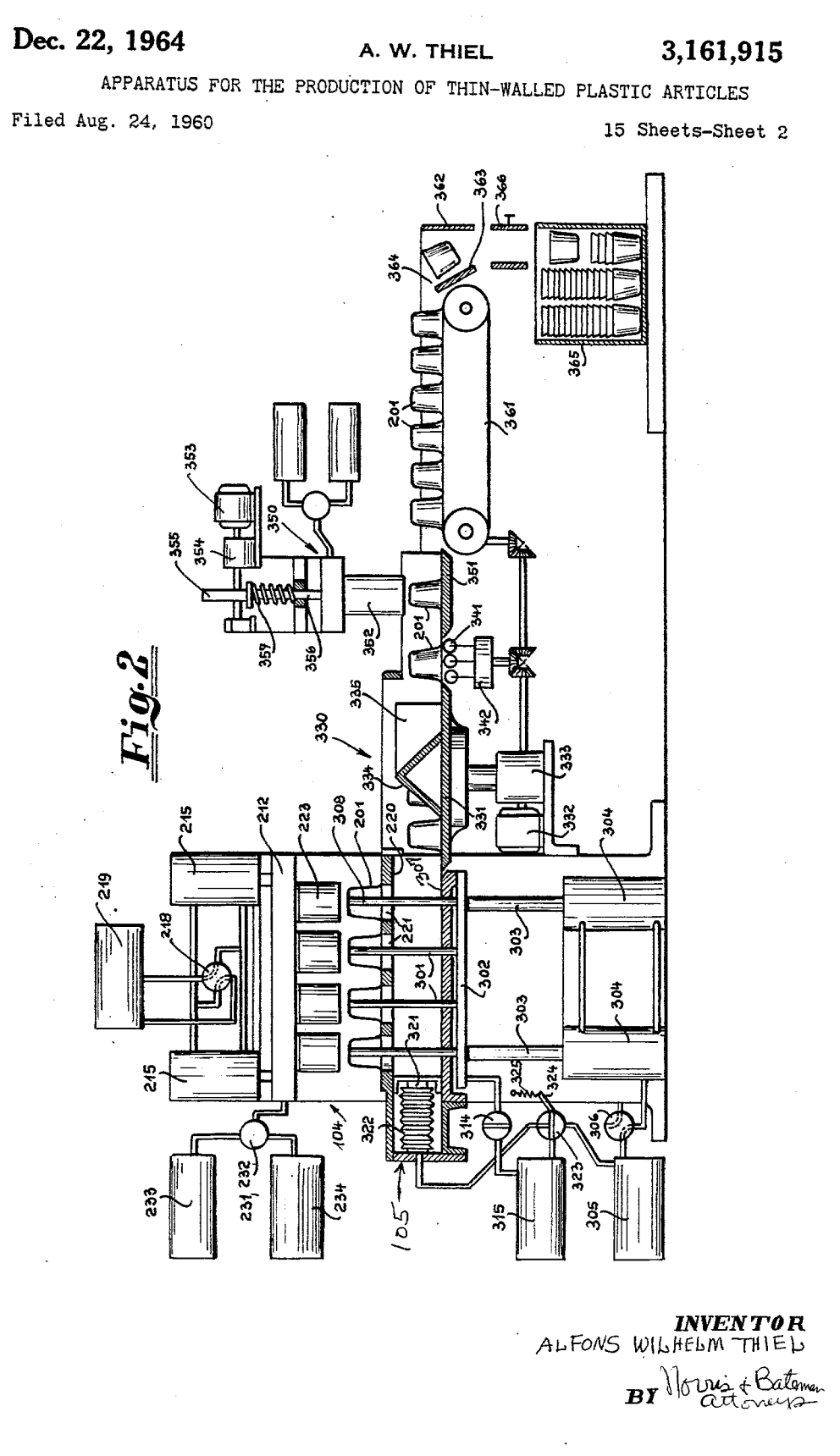

The punching-out station 104 as shown in FIGURE 2 involves a punching-out machine, the punching platform 220 of which is disposed below the cutting die carrier 212, the said platform being provided with apertures 221 through which the punched-out shaped workpieces descend. For the upward and downward movement of the cutting die carrier 212 and the cutting tools 223 connected thereto, a hydraulic operating device is provided with hydraulic cylinders 215. Upper and lower connecting pipes 216 and 217 of the cylinders 215 are connected by way of a control valve 218 to an oil presure reservoir 219. A collecting and forwarding device 105 for the punched out articles is located below the platform 220.

Ejection means cooperating with said cutting tools 223 are provided as disclosed in my U.S. patent application 771,864, (now Patent No. 3,115,677), for operation, said ejection means being connected by way of control valves 231 and 232 to a vacuum device 233 and a compressed air supply 234, respectively.

For the ejection of the punched-out shaped articles 201, the air valve 232 is opened for a short time. In order to return these ejection means to their initial position, the valve 232 is closed and for a short time the valve 231 is opened, so that the air contained in the ejection means is removed by suction.

FIGURES 1 to 4 show a first embodiment of the collecting and forwarding device for the punched-out shaped workpieces 201. In this embodiment bar-shaped collecting elements 301 are provided which are mounted on a common carrier 302 and are displaceable therewith vertically. For this purpose the carrier 302 is mounted on piston rods 303 of a pneumatic operating device which is disposed below the carrier and comprises compressed air cylinders 304 which are connected in parallel and are connected to a compressed air supply 305 by way of a control valve 306.

The collecting elements 301 project upwards from the carrier 302 through guide apertures in a collecting platform 307 disposed below the punching platform 220 and also through the apertures 221 in the punching platform 220. The length of stroke of the pneumatic operating device 303–304 is so calculated that in the bottommost position of the carrier 302 the upper ends 308 of the collecting elements 301 are flush with, or below, the upper surface of the collecting platform 307.

As FIGURES 3 and 4 show, the carrier 302 for the collecting elements 301 consists of a frame which is formed of tubes 309, and is provided with a connecting pipe 310. The collecting elements 301 likewise are tubular and are mounted in the tubes 309. The passage 311 in the collecting elements 301 opens into the passage 312 of the tubes 309, and the upper end of the passage 311 in a collecting element 301 opens into the middle of a suction cup 319 mounted on the element. The suction cup 319 is made of elastic material, for example rubber. A vacuum device 315 is connected, by way of a control valve 314 and the connecting pipe 310, to the carrier 302.

An ejecting device is provided for forwarding the punched-out cup-like workpieces 201 which have been guided by the collecting elements 301 onto the collecting platform 307. The ejecting device (FIGURES 1 and 2) comprises an ejecting plate 321 which is displaceable horizontally over the collecting platform 307. The ejecting plate is provided with an actuating device, for example, a bellows 322 made of rubber or some other elastic material, which is connected by way of a control valve 323 to the vacuum device 315 and to the compressed air supply 305. The valve 323 is provided with a control lever 324, which is constantly urged upwards by a spring 325. In the upper position of the actuating lever 324 the bellows 322 is connected to the vacuum device 315, whereas in the lower position of the lever 324 the bellows is connected to the compressed air device 305. The lever 324 is so positioned that it is pressed downwards by the carrier 302 for the collecting elements 301 when the said carrier reaches its lower end position.

During operation, the carrier 302 with the collecting elements 301 is normally in the lower end position. As soon as the conveying device has advanced the plastic band 114 by one feed step, the actuating valve 306 is changed over and thereby the carrier 302 and the collecting elements 301 are lifted by a very small amount which is sufficient to allow the lever 324 to switch over the valve 323 to connect the bellows 322 to the vacuum installation 315. As a result of this the extended bellows 322 is contracted and the space above the collecting platform 307 is freed for the collecting elements 301 which pass through the surface of the collecting platform 307 and through the apertures 221 in the punching platform 220 from below into the shaped workpieces 201 and bear with their suction cups 313 against the under faces of the said workpieces. A vacuum from the vacuum device 315 through the valve 314 is applied to the suction cups 313 which attach themselves securely to the under faces of the shaped workpieces 201. As soon as the punching operation described hereinbefore has been concluded to punch the workpieces out of the strip, the valve 306 is changed over and the carrier 302 with the collecting elements 301 is lowered. As soon as the shaped workpieces 201 have been placed on the collecting platform 307, the valve 314 is shut off and the connection between the suction cups 313 and the shaped workpieces 201 is broken. The collecting elements 301 then sink below the collecting platform 307.

As soon as the carrier 302 reaches its lower end position, it again operates the valve 323 with its lever 324 and connects the bellows 322 to the compressed air supply 305. The bellows 322 expands and the plate 321 pushes the shaped workpieces 201 along the platform 307 onto a distributor 330. The distributor 330 comprises a rotating disc 331 which is driven by a motor 332 by way of a reduction gear 333. The disc 331 carries centrally on its upper face a cone 334, and there also is a defending plate 335 for transferring the punched-out shaped workpieces 201 to an elongated conveying device which comprises at its front end conveying rollers 341 which are driven by the motor 332 by way of gearing 342. The rollers 341 transfer the shaped workpieces 201 to a platform 351 of a second punching device 350. The second punching device 350 is constructed substantially in the same manner as the first punching device 104, but has only a single punching element 352, provided with a single cutting die, which trims all the workpieces 201 to exactly the same size. An electric motor 353 with a reduction gear 354 connected thereto is provided for operating the second punching device 350. The reduction gear 354 is preferably an infinitely variable gear in order to permit adaptation of the operation of the punch 352 to the travelling speed of the distributor 330. The gear 354 carries at its output side an eccentric 355 which is mobile on the upper end of the operating push rod 356 of the punch 352. Disposed about the push rod 356 is a spring 357 which urges the punch 352 into its upper position.

The shaped workpieces 201 are forwarded from the rollers 341 by a feed means, known per se and not shown, to the punching platform 351 and thence after the second punching operation to a conveyor belt 361. The waste material produced at the second punching device 350 is removed from the punch 352 by a device, known per se, which is not shown.

It is to be noted that the second punching device 350 is only to be put into operation when the workpieces produced are to be trimmed to size with great precision. This is the case more particularly with precision articles and workpieces which are intended for example for delivery to automatic machines. It should be borne in mind that when the second punching device 350 is in operation, the punching cylinders 223 of the first punching device are so selected that an appropriate rim of material is left on the workpieces 201 for subsequent trimming.

From the second punching device 350, the workpieces travel over the conveyor belt 361, and are tested for shape and quality.

At the end of the conveyor belt 361 is situated a deflecting device 362 containing a deflecting plate 363 which provides a tripping edge 364 at its upper end. The workpieces 201 arriving at this tripping edge 364 are tilted over thereby and travel head-first through the deflecting device 362 into a pack 365. A counting device 366, known per se, which is illustrated diagrammatically, can be arranged between the pack 365 and the deflecting device 362.

FIGURES 5 to 8 show a modified embodiment of the collecting and forwarding device for the punched out shaped workpieces 201. In this embodiment the punching out device 104 has the same structural features as they have been described in my U.S. patent application 771,864. Therefore the same reference numbers relate to the same parts as they are shown in the said patent application. In the embodiment of FIGURES 5 to 8 the punched out workpieces fall vertically down through openings 221 in the punching platform 220 onto the collecting and forwarding device. Said collecting and forwarding device comprises a continuously driven conveyor belt 440 in subjacent position to the punching platform 220 as schematically shown in FIGURE 6. A receiving cage 441 is provided in the space between the conveyor belt 440 and the punching platform 220, said cage consisting of crossing metal sheets 442 fixed within a frame 443 and providing for as many receiving compartments as openings 221 are provided in the punching platform 220. Said frame 443 is connected for upward and downward movement through piston rods 445 with hydraulic cylinders 444 similar to the hydraulic cylinders 215 of the punching device. Upper and lower connecting pipes 446 and 447 of the cylinders 444 are connected by way of a control valve 448 to an oil pressure reservoir 449.

In operation the falling down workpieces are received by the compartments of cage 441 ensuring upright positioning of the workpieces onto the conveyor belt 440. When the workpieces 201 have been collected onto belt 440 and have been stabilized in upright position the cage 441 is moved upwardly and the workpieces 201 are released to travel with the conveyor belt 440. In order to avoid that the workpieces fall over during the upward movement of the cage 441, said upward movement should be sudden as a jerk.

As may be seen from FIGURE 5, the workpieces 201 are moved along deflecting sheet walls 450 and 451 in order to put them in on line. If necessary the belt conveyor may comprise a first belt subjacent to the punching platform 220 and a second faster driven belt in the region of the deflecting plates 450 and 451. At the end portions of the belt conveyor discharge means are provided at the side edge of the belt. Said discharge means comprise a rotating disc 452 having teeth 453 and between these teeth 453 rounded edge portions 454 adapted to the shape of the workpieces. A guiding plate 455 is fixed to the conveyor frame below said discharge disc guide. A guiding wire 456 surrounds the disc 452 in a space adapted to the diameter of the workpieces 201. By this guiding wire 456 such workpieces which are not properly engaged by the discharging disc 452 are thrown back onto belt 440 in order to be conveyed to a container 457.

Disc 452 and conveyor belt 440 are driven by an electrical motor 458 through gear means 459.

As may be seen from FIGURES 5, 7 and 8 a special treatment station may be followed to the discharge disc 452, to provide for rounded end portions 460 of the workpieces 201. Said treatment station involves a rotating disc 461 carrying form sockets 462 onto which the punched out workpieces are fed by the discharge disc 452 through an opening 463 in the guiding plate 455. An additional heated shaping member 464 is provided for each form socket 462 and is mounted for the same rotation movement as its form socket 462 but at the same time for upward movement with respect to the form socket 462. Therefore a guiding disc 465 is fixed to the carrier disc 461. The upward and downward movement of tool 464 is controlled by stationary guiding rails 466 within which guiding rollers 467 of the forming elements 464 are running.

The additional forming tools as shown in FIGURE 8 consist of a tool head comprising at its inner surface a conical entrance zone 470, a slightly conical directing zone 471 and a rounded forming zone 472. The tool head 468 is further provided with electrical heating means 473.

In the additional treatment station further pressure air means 474-468 are used to press the workpiece 201 onto its form socket 462 during the feeding action and to discharge the workpiece from said station. In operating the workpiece 201 falls through the opening 463 of the guiding plate 455. At the same time pressure air valve 476 is opened by an actuating nose 477 of which is attached to each form socket 462 and cooperating with an actuating rod 478 of valve 476. Pressure air is blown through nozzle 475 from above onto the workpiece 201 to press it onto said form socket 462. As soon as nose 477 leaves rod 478 during the rotataion of discs 461 and 465 driven by driving means 479 through a driving pinion 480 and a gear ring 481, valve 476 closes. During the further rotation of the said discs 461 and 465 tool 464 is lowered by the guiding rails 466. Thereby the conical zone 470 of the inner tool surface comes in contact with the outer edge of the rim 482 of the workpiece 201 and during continued lowering down of the tool 464 the said rim 482 is introduced in the slightly conical zone 471 of the inner tool surface. Thereby said rim is bent in vertical direction and is introduced into the rounded zone 472 to become entirely rounded. The rim of the workpiece 201 is reversely curved externally thereof. After this forming action the tool 464 is lifted again during its circular path by the guiding rails 466, but the workpiece remains on its form socket and comes in its circular path in subjacent position to be a discharge tube 483. At the same time a second actuating nose 484 each one of which is attached to each form socket 462, comes in contact with the actuating rod 485 of a second air valve 486. A compressed air jet is blown by nozzle 487 through a bore 488 into the hollow part of the workpiece 201, said workpiece 201 being blown thereby through the discharge conveyor belt 489.

Counting means 490 may be used at said discharge conveyor belt 489 as well as collecting means 491 for the workpieces 201. Said collecting means may comprise deflecting plates 491 and a discharge door 492 which is controlled by the counting means 490 in order to collect a desired number of workpieces 201, for example fifty pieces, and to introduce them into a container 493.

Referring to FIGURE 9, group A, the shaping of the workpiece starts by the preparation of an edge part 2 which immediately follows a wall 1 of the workpiece, and an untreated edge part 3 is provided which immediately follows the edge part 2. The part 3 is immediately followed by the material of a plastic strip 4 from which the workpiece 1 is produced. As is clearly apparent in views a, b and c, the edge part 2 should be prepared and bent as far as possible. The extent to which this should be done depends upon prevailing conditions, for instance, the nature of the material, the shape of the workpiece 1 and so. Without being intended to limit the extent to which the untreated edge part 3 can be bent inwards, group A of FIGURE 9 illustrates three cases which are possible with the process according to the invention. Referring to case a, the untreated edge part 3 still projects outwards from the workpiece. In the process according to the invention the part 3 can readily extend even more outwards. Case b is the critical case in which the untreated edge part 3 extends vertically. Finally, in case c the untreated edge part 3 inclines towards the workpiece. In the embodiment illustrated the untreated edge part 3 extends substantially parallel with the conical workpiece wall 1. The extent to which the edge part 3 can incline inwards is limited by the resilient deformability of the shaped material, i.e., the inward inclination of the part 3 can be effected to such an extent as the resilient deformability of the material makes it possible to remove the workpiece from the mould readily.

The punching-out and cutting-to-shape step is diagrammatically illustrated in FIGURE 9B. As can be seen, the cut-to-shape part is with advantage so placed that the transition between the strip of material and the untreated edge part 3 is severed with the waste. In case a of group A such a cut can readily be performed. In cases b and c, an aligning arrangement 6 associated with a knife 5 can place the untreated edge part 3 so far outwards, because of its resilient deformability, that the knife 5 can reliably cut the edge part 3 to the required size.

Finally, group C shows the operation of the stamping device. The prepared or preshaped edge part 2 is guided accurately on a trestle 7, while a descending mould 8 is first being exactly centered, by means of the entry zone 9 of its operative surface, in relation to the cut-to-shape untreated edge part 3, whereafter the guiding zone of the mould operative surface engages with the terminal edge of the part 3 and presses the same increasingly inwards. Those parts of the untreated edge part 3 which are engaged by the said guiding zone are already heated so that there is no possibility of any creasing. The untreated edge part 3 is therefore introduced reliably into the shaping zone 11 of the operative surface, so that the untreated edge part 3 is shaped cleanly. As a comparison between the three illustrations d, e and f will show, the only result of increasing the amount by which the untreated edge part 3 is bent over is that the same engages later with the guiding zone 10 of the moulding tool 8. In any case, the result of introducing the untreated part 3 into the moulding tool accurately and cleanly is that the edge of the finished workpiece has exactly the shape for which the tool 8 is designed.

Consequently, to carry out the process according to the invention workpieces must be produced which have a preshaped edge part 2 following the workpiece wall 1, and an untreated edge part 3 following the preshaped edge part 2. Accordingly, in the shaping device diagrammatically illustrated in FIGURE 10 a shaping tool 122 is provided which is adapted to descend on a heated plastic strip 121, the same sagging at 128 after the fashion of a sack. The shaping tool is mainly a negative mould with mould cavities 123. The same communicate through ducts 124 with a chamber 125 connected to an evacuating device. At the bottom edge of the mould cavities 123 ring-like mould parts 126 (FIGURE 11) are provided which project beyond the bottom surface of the shaping tool 122. In the embodiment illustrated, the surface parts of the underside of the tool 122 which lie between the annular arcuate in cross section projections 126 communicate through ducts 127 with the chamber 125 in order that, when the articles are being shaped, the heated strip material may be engaged by the external air pressure with the bottom of the shaping tool 122 near the projections 126 and in order that the annular arcuate in cross section projections 126 may be simulated in the shaped strip.

Shaping proceeds as follows: the material strip 121, before entering the region below the shaping tool 122, is so heated that it sags after the fashion of a sack as shown at 128 and over a length corresponding to shaping tool length. Such length also corresponds to one feeding step of a conveyor 129. After such a feeding step has been performed, the shaping tool 122 is lowered until it engages with the edge parts of the sagging part 128 of the strip and, due to its downward movement, forms an air cushion between the sagging strip 121 and the mould cavities 123. Simultaneously, a rectangular clamping frame 130 is pivoted upwards to provide an air-tight closure and clamping between the edge of the tool 122 and the edge parts of the strip part 128 which is to be shaped. To provide additional elongation and pressing of the strip, the air cushion can be increased by an excess pressure or a negative pressure being produced one or more times in the chamber 125. For shaping, the chamber 125 is evacuated and, as can be seen in FIGURE 10, the plastic material of the strip 121 deforms and is closely applied to the surface of the cavities 123, to the projections 126 and to the flat parts between the projections 126. The plastic material cools immediately it contacts the shaping tool and, as it cools, sets. The tool 122 is then raised and workpieces 131 integrally preshaped in the strip 121 result, as can be seen on the right-hand side of FIGURE 10.

A variant of the shaping device is illustrated in FIGURES 11 and 12. In the device illustrated in FIGURES 11 and 12, the heated and sagging plastic strip is acted upon not only by the clamping frame 130 but also by extenders 132 which are operative upwards. The extenders 132 are so moved as to advance, together with the sagging strip 121, into the said air cushion; the same therefore first tends to press the plastic strip against the surfaces of the extenders 132. The chamber 125 comprises an outlet 133 and valve means 134 to vary the air cushion effect and more particularly so to control the air cushion that none of the plastic strip 121 engages prematurely with the projections 126. An ejector plate 135 is mounted in the shaping tool 122 and, as can be seen more particularly in FIGURE 12, is mounted for movement vertically of the tool 122 and is depressed by springs 136. Consequently, when the tool 122 descends, the ejector plate 135 first engages with the external frame of the strip part 128 to be shaped, thus ensuring that the air cushion can be applied and formed gently. The springs 136 are stretched as the tool 122 continues to descend. After the clamping frame 130 has been pivoted into operation, the extenders 132 are advanced to a position in which the strip material is still just out of engagement with the mould projections 126, whereafter the chamber 125 is evacuated so that the strip material is drawn into the mould cavities 123. The strip material is engaged with the bottom of the ejector plate 135 through the agency of ducts 127, 137.

The mounting of the plate 135 in the tool 122 can be seen in FIGURE 12. The edge of the mould cavities 123 is shaped to form a number of annular parts 138. Between the rings 138 substantially the entire undersurface of the tool 122 is recessed to form a chamber 139 from which bores 140 adapted to receive the springs 136 extend upwards. The ejector plate 135 is mounted in the chamber 139 for vertical displacement and is adapted in shape to the chamber 139. Upward movement of the plate 135 is limited by the base 141 of the chamber 139, and downward movement of the plate 135 is limited by stops 142. The same take the form of rings fitted externally to the bottom of the rings 138 and are secured, for instance, by means of screws 143. To ensure that a clean moulding surface is produced to prepare the untreated outer edge part 3 of the workpiece, the outer rings 142 are wider than the desired width of the outer edge 3, while the ejector plate 135 is recessed in the region of the outer rings 142 in order to engage thereover.

Referring to the example illustrated in FIGURE 13, a shaping tool 152 is provided which is formed with mould cavities 153 and is a negative mould disposed above a strip 151 of material to be shaped. The tool 152 is disposed inside a casing 154 connected through a port 155 to a vacuum pump. Disposed below the casing 154 and tool 152 is a peripheral packing 156 which engages in sealing-tight manner with the strip 151 to be shaped and cooperates with the casing 154 and strip 151 to form a closed chamber adapted to be evacuated. Above the tool 152 the casing 154 is formed with an evacuable chamber 157 communicating through ducts 158 with the mould cavities 153. This entire shaping tool unit is vertically reciprocable and is moved, for instance, to a pneumatic or hydraulic device, the piston rods 159 of which are diagramatically illustrated. A conventional clamping frame 160 is disposed below the shaping tool unit 152–159. The frame 160 can be adapted for substantially vertically movement in any desired conventional manner in order that it may be moved upwards and pressed against the strip 151 to be shaped, a vacuum-tight sealing of the strip 151 being provided by means of a peripheral packing 156 on the outer edge of the shaping tool 152. In the example illustrated the frame 160 is mounted for pivoting around a horizontal spindle 161 which can be placed, for instance, on the delivery side of the shaped workpiece as indicated by an arrow 162 denoting the direction of movement of the strip 151. The clamping frame 160 can be operated by a pneumatic or hydraulic device of which, for the sake of simplicity, only a piston rod 163 is indicated. The same engages with a lever arm 164 rigidly secured to the frame 160. Extenders 165 known per se are provided inside the frame 160; they are disposed on an extender support 166 and can be raised and lowered together therewith by a pneumatic or hydraulic actuator. In the embodiment illustrated pneumatic cylinders 167 having pistons 168 are provided, the extender support 166 being borne by piston rods 169. For actuation, the cylinders 167 are connected through connections 170 to a compressed air device.

The extender support 166 takes the form of an airtight plate which moves upwards into the interior of the frame 160. The plate 166 comprises on its outer edge a peripheral packing 171 which slides in sealing-tight manner on the inner surface of the frame 160. Consequently, when the extenders 165 move upwards, there is formed, below the strip 151 to be shaped, an enclosed chamber, the top of which is formed by the strip 151, the bottom by the plate-like extender support 166 and the side walls by the frame 160. This closed chamber 172 is relatively low, for the clamping frame 160 is, of course, narrow, and so the volume of the chamber 172 is reduced. This is very important for the invention, for only in such a chamber of such a reduced volume is it possible to produce a brief pulse of compressed air of the kind provided by the invention. Such pulse can be produced just by the rising of the support 166.

In the embodiment illustrated, the chamber 172 is also connected to an air compressor or to a compressed air reservoir 173. To this end, the support 166 comprises a hollow guide pin 174 which also cooperates with a slideway 175 to prevent the support 166 from tilting out of the horizontal plane, thus ensuring that the packing 171 is introduced reliably into the interior of the frame 160. Connected to the pin 174 is a flexible air pipe 176 which is connected through an automatic valve 177 to an air reservoir 173. An automatic outlet valve 178 is connected to the pipe 176.

To lock the air-tight support 166 in its top position, to prevent the pulse of compressed air from being absorbed by the pneumatic cylinders 167 and thus being reduced, locking means are provided, in the form of a shoulder 179 with which the pin 174 is formed and over which a pneumatically operated bolt 180 engages. The pneumatic cylinders 181 for the bolt 180 can be independently operated automatically. Alternatively, and as shown in the example illustrated, the compressed air cylinders 181 of the bolt 180 can be connected directly to the compressed air cylinders 167 of the pneumatic raising device for the extenders 165, and the impact pressure produced in the top of the cylinders 167 when the extenders 165 rise can be used to press the bolt 180 against the guide pin 174 and to move it behind the shoulder 179. In such a case, however, the top of the cylinder 167 must be briefly subjected to a negative pressure to release the bolt 180, and this negative pressure event must be controlled automatically in the machine cycle.

The machine according to the invention operates as follows: The strip 151 to be shaped, before reaching the vacuum shaping machine, is so heated, for instance, in the region where the arrow 162 is disposed in the drawing, as to sag after the fashion of a sack, as shown below the arrow 162. The lateral edges of the strip 151 are excluded from the heating so as to form a firm frame. The firm frame parts extending transversely of the strip 151 are formed by an unpreheated—i.e., firm—part of the strip 151 following the preheated part thereof on the right-hand side of FIGURE 13, while at the left-hand end of the sagging part of the strip 151 the packing 156 on the right-hand side of the machine in FIGURE 13 produces a transverse part between the shaped piece of the strip 151 and the following piece.

To push up the strip 151, the shaping unit 152–159 is in its top position, while the extenders 165 have been withdrawn downwards and the frame 160 has been pivoted down.

Once the sagging part of the strip 151 is below the shaping tool, the unit 152–159 is lowered and the frame 160 is pivoted upwards. The strip is therefore clamped between the top edge of the clamping frame 160 and the packing 156 so that the vacuum shaping tool is sealed satisfactorily. Thereafter the extenders 165 are raised in the manner described in the parent patent. As the extenders rise, the airtight extender support 166 engages by its packing 171 in the interior of the frame 160. However, there is initially no increase in the air pressure in the chamber 172 thus formed, since air can escape through at least one lateral exit aperture 182 in the frame 160. Once the packing 171 has covered the aperture 182, the air pressure in the chamber 172 can increase pulsewise. In the example illustrated, however, such an increase is prevented because the outlet valve 178 is open. The extenders 165 therefore rise to their top position without any additional supply of compressed air. The bolts 180 engage below the shouldered part 179 of the guide pin 174 in the manner hereinbefore described once the extenders 165 are in the top position. The chamber 157 is then evacuated through the port 155 and the strip 151 starts to be sucked into the mould cavities 153.

In order that the treatment strip 151 may be given, during this vacuum shaping step, the pressing and extending treatment which has been started by the extenders but which the same cannot complete, the valve 178 is closed briefly after the beginning of suction and the valve 177 is opened briefly. The term "briefly" should be understood in this connection as meaning that the pulse of compressed air is produced when the strip 151 is lifted off the extenders 165 by the vacuum but has not yet engaged in the mould cavities 153. Immediately after the pulse of compressed air has been produced, the guide pin 174 is unlocked by the top of the cylinders 167 being subjected to a brief negative pressure, so that the descent of the extenders 165 is initiated. Also, the valve 178 is opened so that the compressed air can escape. In the meantime, however, the packing 171 has uncovered the aperture 182 in the clamping frame so that some of the compressed air also escapes through the aperture 182 and eddies are therefore produced inside the chamber 172, such eddies flowing along the underside of the strip in engagement with the shaping tool and cooling such strip. To limit the ascent of the extender plate 166, abutments 183 can be provided on the top and can engage with an annular bead 184 inside the frame 160.

Where the extenders 165 are formed with a blowing surface, the air pipes to the extenders can be disposed below the plate 166 and extend, near the extender rods 185, through the plate 166 into such rods.

Other embodiments of the invention are possible in addition to the example illustrated, the important thing being that a brief pulse of compressed air must always be provided. The compressed air pulse can be varied in timing near the end of the advance movement of the extenders and the beginning of the suction effect in the shaping tool, to suit actual requirements. This embodiment of the shaping device has the particular advantage that the edge parts of the workpieces to be shaped are pressed very reliably against the edge beads surrounding the mould cavities, and such edge parts or regions are prepared very satisfactorily for subsequent beading.

The shaped strip 201 passes from the shaping device to a punching device, two basic embodiments of which are illustrated in FIGURES 14 and 15. In the embodiment illustrated in FIGURE 14, punching knives 202 are secured by retaining elements 203 on a vertically reciprocable carrier plate 204. Aligning and distributing sleeves 205 are mounted inside the sleeve-like knives 202 for vertical movement relatively thereto. The sleeves 205 have on their bottom edge annular aligning parts 206 which engage into the preshaped edge part 2 of the workpiece. Consequently, when the punching device descends the sleeves 205 first engage with the workpiece surface and the ring 206 enters the preshaped edge part 2. Only when this step has been completed does the sleeve 205 release the punching knife 202. This ensures that the edge part 3 is cut to shape accurately.

To release the punched-out workpiece from the punching device, more particularly from the sleeve 205, ejector devices are provided which, in the embodiment illustrated, take the form of bellows 207; the same are connected through ducts 208, a pipe 209, a valve 231 and a valve 232 to a vacuum device 233 and a compressed air device 234 (see FIGURE 16). The bellows 207 are contracted before and during punching by being connected by the valve 231, 232 to the vacuum device 233. Upon the completion of punching the valve 231, 232 connects the below to the compressed air device 234, the belows 207 are inflated and the workpieces are therefore pressed out of the sleeves 205. The punching base 220 is formed with apertures 221 for onward conveyance of the punched-out articles.

In the example shown in FIGURE 15, the punching device is of substantially the same construction as in FIGURE 14, except that the knives 210 themselves have an aligning and distributing surface 211 and comprise a ring 212 which enters the preshaped edge part 2. However, to ensure that the cutting edges of the knives 210 are released only when the surfaces 211 rest completely on the workpiece surface and the rings 212 have entered the preshaped edge parts, a safety plate 213 is provided which, when the punching device is in the bottom position, engages with the punching base 220 and the punched-out plastic strip 201 resting on such base. In the present case the ejector device 207, 209 is of similar design to that shown in the example of FIGURE 14. In both cases the punching device can be operated by means of hydraulic or compressed air cylinders 215 which are supplied through an automatic valve 216 from a device 219 operating either on pressure oil or on compressed air (see FIGURE 16).

FIGURES 16 to 19 illustrate an embodiment of the stamping device which is combined with its feed device and with a device for onward conveyance of the finish-treated workpieces, to form a single machine unit and which directly follows the punching device.

The workpieces 201 are conveyed by a rotating plate 401 on which, as can be seen more particularly in FIGURE 17, raisable plates 402 are disposed. The same bear on their tops trestles 403 on which the prepared and punched-out workpieces 201 are placed.

In order that the workpieces 201 which leave the punching device through the apertures 221 may be placed directly on the trestles 403, the plate 401 extends to below the punching base 220. The machine frame 218 of the punching device is therefore designed correspondingly for the plate 401 to extend through it.

Sucking and guiding fingers 404 are provided to transfer the articles 201 reliably. The fingers 404 are disposd on a common frame 405 in the form of a tubular frame which is disposed on the piston rods 406 of a compressed air raising and lowering device 407. The fingers 404 can be lowered to below the bottom surface of the plate 401 by the device 407. Before punching starts, the fingers 404 are raised by the device 407 to their top position in which, as can be seen in FIGURE 16, they extend through apertures 408 in the plate 402 and in the trestles 403 and through the apertures 221 in the punching base 220 as far as, or to slightly below, the inner base surface of the workpieces 201. Upon the completion of punching the fingers 404 are lowered into their lowest position; as they descend, they take the workpieces 201 along with them and place them firmly on the trestles 403. The vertical movements are performed through the agency of a compressed air device 409 and of a valve 410 through which the compressed air device 409 is connected to the compressed air cylinders 407.

For firm retention of the articles 201 on the top apex of the fingers 404, the same are formed with lengthwise bores. The frame 405 is also formed with bores which are connected to a vacuum device 416 through a connecting member, a flexible tube 414 and a valve 415. To improve the engagement of the workpieces 201 on the points of the fingers 404, the finger points or apexes 417 comprise nozzle-like cups made of a resilient substance, such as rubber, so that the negative pressure can be fully operative on the base of the articles 201. By means of an operating arm 418 and spring 419 of the valve 415, the frame 405 of the fingers 404 so controls the valve 415 that the same closes automatically when the frame is in its bottom position.

With this method of transferring the articles 201 from the punching device to the plate 402, the trestles 403 must correspond in number and arrangement exactly to the punching device. When the same is replaced, an appropriate different plate 402 can readily be fitted.

The plate 401 is rotated stepwise by a motor 420 and a transmission 421. Each plate 402 with its trestles 403 is moved stepwise from the position below the punching device to a position below the stamping device 422. The same contains stamping moulds 423 (FIGURE 18) to the same number as there are trestles 403 on the plate 402.

As can be seen in FIGURE 18, the stamping mould 423 can comprise an operative surface which is subdivided into an introductory zone 424, a deflecting and guiding zone 425 and a rounded shaping zone 426. Electric heating means 427 can be provided at least for the guiding zone 425 and for the shaping zone 426.

For reliable removal of the articles from the stamping tool after the stamping step, and to place the same on the trestles 403, bellows-like ejectors 428 can be provided above the stamping tools; such devices are connected through a valve 429 to a compressed air device 430 and to a vacuum device 431 in a manner similar to what has previously been described with reference to FIGURES 14 and 15.

In the example illustrated in FIGURES 16 to 19, the stamping device 422 is stationary and the plate 402 is raised and lowered by a pneumatic or hydraulic lever device 432 comprising a pressing device 433 and a control valve 434. The workpieces are introduced accurately into the stamping device 422 by means of guide elements 435.

The plates 402 move stepwise from the stamping device 422 to a transfer device 440 mainly comprising a carriage 441 movable on rails 442. The carriage 441 bears on its underside a porous plate 443 above which is a chamber 444. The same is connected through a control valve 445 to a vacuum device 446. Below the plate 401 and near the carriage 441 is a raising and lowering device 447 comprising guiding fingers 448 adapted to be raised by the device 447. As they rise, the fingers 448 extend through the bores 408 in the plate 402 and in the trestles 403, disengage the finished articles 201 therefrom, and raise the articles as far as the underside of the porous plate 443 where they are retained by suction. The fingers 448 are immediately lowered and the carriage 441 is moved away from the plate 401 over a conveyor belt 449. In this position the suction operative by way of the valve 445 is stopped and the finished articles drop onto the belt 449 by which they are conveyed, in a similar manner to that shown in FIGURES 5 and 7, to a packing station. The device 447 is controlled and operated similarly to the device 407 associated with the fingers 404. To this end, a pneumatic or hydraulic pressure device 450 and an automatic control valve 451 are provided.

Bearing rollers 452 can be provided to ensure that the plate 401 runs quietly and reliably.

In the embodiment illustrated in FIGURES 20 to 22, the further treatment device for the articles is a stamping device for beading over the stamped-out edges of the articles. The punching device of this embodiment can be of the same design as in the example shown in FIGURES 16 to 19, and so for the sake of clarity the machine frame of the punching device is not shown in FIGURES 20 and 21. As in the example illustrated in FIGURES 16 to 19, the punching tools are disposed above the punching base 220 and are mounted for vertical reciprocation. Such reciprocation is produced by hydraulic or pneumatic cylinders 215 supplied through a valve 216 from a hydraulic or pneumatic pressure device 219. The ejector devices associated with the punching tools can be of the same design as in the example shown in FIGURES 14 to 19 and can be operated by the same vacuum and compressed air devices 233, 234 through the control valves 231, 232. The base 220 is formed with apertures 221 through which the punched-out workpieces 201 can drop.

In this example the space below the base 220 is kept free and can be entered by the carriage 501, the same moving into a left-hand end position as shown in FIGURES 20 and 21, in which position the trestles 503 on the carrier plate 502 are immediately below the apertures 221 in the base 220. To enable it to perform this lateral reciprocation, the carriage 501 runs on wheels 521 which run on lateral rails 552. The carriage 501 is reciprocated by one or by a pair of hydraulic or pneumatic cylinders 520 diagrammatically illustrated in FIGURES 20 and 21 and controlled in a manner to be described hereinafter. In addition to its carrier plate 502 with the trestles 503, the carriage 501 also comprises transfer fingers 504 which, as in the example illustrated in FIGURES 16 to 19, are mounted for vertical displacement in vertical central bores in the trestles 503. In contrast to the example illustrated in FIGURES 16 to 19, however, the fingers 504 always remain in the bores in the trestles 503 and are therefore reciprocated together with the carriage 501. The advantage of this is that the fingers 504 give the articles 201 extra protection against dropping off their trestles when the carriage 501 is reciprocated. The fingers 504 therefore comprise at the top caps 505 which are adapted to the inner shape of the workpieces 201 and which can be produced, for instance, from a foamed plastic and which engage in sealing-tight manner with the inside of the articles 201, thus improving the negative pressure applied by the vacuum device 516 through the hollow fingers 504 and the connecting tube 514 and the control valve 515. The operation of the valve 515 will be described in greater detail hereinafter.

For vertical reciprocation of the fingers 504, each such finger comprises a preferably pneumatic cylinder 507. In the example illustrated the fingers 504 extend vertically through the cylinders 507, and their bottom ends which project out of the cylinders 507 are connected to a vacuum pipe 514. In the centre each finger 504 bears a piston plate 506 which can be supplied to the cylinder 507 from two sides. The cylinders 507 are connected to a compressed air device 509 through a change-over valve 510.

The stamping tool 523, 522 is of similar design to that shown in FIGURES 16 to 19 but is suspended in a similar machine frame as that of the punching device for vertical reciprocation. The range of movement of the carriage 501 is such that the right-hand end position of the carriage 501 in the drawings corresponds to a position in which the trestles 503 are correctly positioned below the stamping device 522.

As can be seen in FIGURE 22, the stamping device 522 is of fundamentally the same design as in the example shown in FIGURES 16 to 19 and has, as in such example, a plurality of stamping moulds which are formed with a very conical introductory zone 524, a slightly conical deflecting and guiding zone 525 and a rounded shaping zone 526. As in the case shown in FIGURE 18, the stamping moulds comprise electrical resistance heating means 527 which heat the mould surface at least near the operative zones 524, 526.

As in the case shown in FIGURE 18, similarly, in the example shown in FIGURE 22, the stamping device comprises bellows-like ejector elements 528 which extend downwards into each stamping mould. The elements 528 comprise at their lower ends in this example additional suction cups 532, the underside of which communicates through suction nozzles with the interior of the elements 528. The same communicate through a control valve 529 with a compressed air device 530 and with a vacuum device 531 in a manner similar to that shown in FIGURE 18.

In addition to what is done in the embodiment illustrated in FIGURE 18, in the present case the stamping device 522 is mounted for vertical reciprocation in the machine frame on diagrammatically illustrated guide elements 533. The device 522 is vertically reciprocated, in a manner similar to that in which the punching tools are vertically reciprocated, by means of hydraulic or pneumatic cylinders 534 which are connected through a change-over valve 535 to a hydraulic or pneumatic pressure device 536. Just as in the case of the punching device, the arrangement is such that the device 522 is suspended on the piston rods 537 of the hydraulic or pneumatic cylinders 534.

The device 541 which receives and conveys onwards the finished articles is, in the present case, in direct succession to the carrier plate 502 of the carriage 501 and mainly comprises a light wire basket comprising vertical article-receiving ducts 542 adapted in arrangement and number to the punching device and to the stamping tool 522. The basket 541 is so fitted that the ducts 542 are at such a distance from the trestles 503 that, when the carriage 501 is in the position in which the trestles 503 are below the apertures 221 in the base 220, the ducts 542 are positioned exactly below the stamping moulds. The basket 541 is just suspended in a frame 543 on the plate 502 and can be replaced, when it has been filled up with finished articles, while the machine is in operation.

The embodiment illustrated in FIGURES 20 to 22 operates as follows:

When the carriage 501 is in its left-hand end position (not shown), the punch-operating valve 216 is so operated that the cylinders 215 press the punching tool down to cut articles 201 out of the strip of material. Also, the fingers 504 are raised by the control valve 510 being so adjusted that the piston plates 506 are actuated from below by hydraulic or preferably pneumatic pressure. The workpieces 201 which have just been punched out of the strip of material are therefore picked up by the fingers 504. Upon the completion of punching—i.e., when the punching tools have reached their lowest position—the valves 510, 216 are changed over, with the result that the cylinders 215 raise the punching tools, while the cylinders 507 lower the fingers 504 until the same engage by their underside with the caps 505 on the trestles 503 so that the workpieces 201 rest by their edges on the trestles 503. The valve 515 is operated simultaneously with the valve 510 in such a way that, during the ascent and descent, air is sucked through the hollow fingers 504, with the result that the articles 201 are picked up reliably and transferred reliably to the trestles 503. When the fingers 504 are in their lowest position, the valve 515 is operated again to cut the vacuum device 516 off from the flexible pipe 514. Upon the completion of these steps, the carriage is moved by its operating cylinders 520 into its right-hand end position which is shown in the drawings. Once the carriage 501 has reached such position, the valve 535 is so changed over as to operate the cylinders 534 which lower the stamping device 522. During this descent of the device 522, the valve 529 is so changed over as to connect the bellows-like ejector elements 528 and their suction cups 532 to the vacuum device 531. FIGURE 22 illustrates the stamping device precisely at the moment when the valve 529 is being changed over. The bases of the workpieces 201 have moved into the operative area of the suction cup 532, so that the workpiece wall is protected against being strained during stamping by the cups 532 and by the bellows 528 which are contracted by suction. Once the stamping device 522 has reached its lowest position and stamping has terminated, the valve 535 is changed over so that the cylinders 534 raise the stamping device 522. Since the valve 529 remains in position, the finished articles are lifted off the trestles 503 by the suction cups 532 and retained inside the stamping tool.

When the ascent of the stamping device 522 has terminated, the control for the shifting cylinders 520 is changed over so that the carriage 501 is returned to its left-hand end position. The trestles 503 and fingers 504 are then ready to repeat the process and to receive a further group of articles 201. However, before this occurs the valve 529 is changed over, the interior of the bellows-like ejector elements 528 thus being connected to the compressed air device 530. The bellows therefore widen downwards and the negative pressure operative in the cups 532 is cancelled, so that the finished articles drop into the ducts 542 of the basket 541. They are stacked one above another. When a desired number of such operations has been performed—i.e., a desired number of articles 201 have accumulated in each duct 542, the basket 541 can be replaced by an empty basket.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an apparatus for the production of thin walled plastic articles having a bead of rounded contour on their rim, a first shaping station for shaping each of said articles in a sheet of plastic material such as to have a substantially unbeaded and outwardly and frusto-conically backwardly flared skirt at their rim portions, cutting means for cutting each shaped article from the sheet such as to have a substantially unbeaded skirt, and a second shaping station for forming a bead of rounded contour on the rim of said article, said second shaping station comprising a plurality of shaping tools mounted for movement against the outwardly and backwardly flared skirt of the article and each having a first heated die ring zone for inwardly bending said outwardly flared skirt into a position substantially perpendicular to its former outwardly flared position, said first heated die ring zone having an inwardly frusto-conically tapered heated surface, an inlet region and an outlet region, the inlet region of said first die ring zone having a greater diameter than the outside diameter of the said outwardly and backwardly flared skirt of the article and said outlet region corresponding in diameter to the outside diameter of the finished rim portion of the article, and a second heated die ring zone having a curved surface for engaging said skirt in said perpendicular position so as to form a smooth finished bead of rounded contour on said article.

2. The apparatus defined in claim 1, wherein said first shaping station comprises an evacuable shaping tool which can be lowered on to a heated sagging strip of plastic material and has on the edge of its shaping cavities, projecting shaping parts for that part of the article edge which it is required to prepare, and the cutting means comprises a punch-out device in which at least one adjusting element is associated with each of the blades cutting workpieces out of the plastic strip and cutting the untreated edge parts to shape, such adjusting elements engaging into the rounded rim portion of the article edge and releasing the punching knife only when the article and the prepared outwardly and backwardly flared skirt have been accurately aligned relatively to said knife.

3. Apparatus according to claim 2, characterised in that each punching knife is associated with an aligning sleeve which is applied to the workpiece surface and which is keyed thereto and which comprises an edge part, the same being engageable in the rounded rim portion of the workpiece edge, and, by its width determining the cut-to-shape width of the outwardly and backwardly flared skirt.

4. Apparatus according to claim 2, characterised in that each punching knife comprises a wedge-shaped surface which is applied to the workpiece surface and which is keyed thereto and which is drawn out to form an edge part beyond the cutting edge of the punching knife, such edge part being engageable in the rounded rim portion of the workpiece edge and, by its width, determining the cut-to-shape width of the outwardly and backwardly flared skirt.

5. The apparatus defined in claim 2 comprising a clamping frame at said first station, means for upwardly displacing said clamping frame into engagement with the material to be shaped to press the material in sealing relation against the edge of said shaping tool, an extender support, means on said support for urging the material to be shaped into said shaping cavities, said extender support comprising an imperforate plate movable into the region surrounded by said clamping frame for cooperating with said frame to provide a compressed air chamber, fluid motor means for displacing said plate into said region, and a packing on said extender support for engaging the inwardly facing surface of said clamping frame in sealing relation therewith.

6. Apparatus according to claim 5, characterised in that the compresed air chamber formed by the clamping frame and the extender support is connected to an air compressor by way of a hollow guide pin provided on the bottom of the extender support.

7. Apparatus according to claim 5, characterised in that the extender support comprises locking means for securing said extender support in its advance position where the material to be shaped is urged into said cavities.

8. The apparatus defined in claim 7 wherein said locking means comprises a rigid member fixed to said extender support and depending downwardly therefrom, a horizontal shoulder formed on said rigid member, and means displaceable by said fluid motor means for engaging said shoulder to hold said rigid member and said extender support in raised position.

9. The apparatus defined in claim 1, wherein said second shaping station comprises support means on which said article is adapted to be positioned with the peripheral skirt extending upwardly and outwardly, said shaping tool being vertically movable from above with respect to said support means.

10. The apparatus defined in claim 1, wherein said cutting means comprises a punching platform, a plurality of punching knives, means mounting said punching knives for vertical reciprocation above said punching platform, means providing apertures in said platform each in alignment with respective ones of said punching knives, said punching platform being operable to support said sheet of material with said shaped articles in alignment between associated ones of said apertures and said punching knives, said punching knives being operable upon downward displacement thereof to extend into said apertures and punch out said articles from said sheet with said apertures being sufficiently large to allow the punched-out articles to drop below said platform, and means below said platform for conveying the punched out articles to said second station.

11. The apparatus defined in claim 10, wherein a workpiece support is provided at said second station and comprises a disc, means for rotating said disc about a substantially vertical axis, a plurality of trestles mounted on said disc and being disposed in a single row along a circular line near the periphery of said disc, means for mounting said punched-out articles in inverted position on said trestles as said punched-out articles are transferred from said punching device, means mounting each of said shaping tools to align with and follow an associated one of said trestles as said disc is rotated, means for removing said articles from said trestles, and means for vertically reciprocating said shaping tools relative to said trestles in timed relation to the mounting and removal of said punched out articles from said trestles.

12. The apparatus defined in claim 11, wherein said means for mounting and removing said punched-out articles with respect to said trestles comprises compressed air blower means.

13. In an apparatus for the production of thin walled cup-like plastic articles having a bead of rounded contour on their rim, a first shaping station for simultaneously shaping a series of said articles in a sheet of plastic material such that each article has a substantially unbeaded and outwardly flared skirt at their rim portions, a cutting station for simultaneously punching out the articles formed at said first shaping station such that each punched-out article has a substantially unbeaded skirt, a second shaping station, and means for simultaneously transferring each series of punched-out articles from said cutting station to said second shaping station, said second shaping station comprising a plurality of shaping tools each having a first heated die ring zone for bending said outwardly flared skirt into a position substantially perpendicular to its former outwardly flared position and a second heated die ring zone having a curved surface for engaging said skirt in said perpendicular position so as to form a smooth finished bead of rounded contour on said article, a plurality of trestles aligning one with each of said shaping tools, means for mounting said punched-out articles one on each of said trestles as they are transferred from said cutting station and means providing displacement of said shaping tools relative to said trestles for simultaneously engaging and shaping the punched-out articles mounted thereon.

14. The apparatus defined in claim 13, wherein said second shaping station comprises a plate means mounting said plate for rotation about a substantially vertical axis, said trestles being mounted on said plate, and means angularly spaced from the region where said punched-out articles are mounted on said trestles for removing said punched-out articles in seriatum from said trestles following engagement of said articles by said shaping tools.

15. The apparatus defined in claim 14, wherein said cutting station comprises a horizontal platform having a series of apertures, a series of punching knives corresponding in number to said apertures and being disposed vertically above and in alignment with said apertures, said platform supporting said sheet with said articles shaped therein vertically between aligned ones of said apertures and said knives, and means for moving said knives relative to said platform to punch-out said articles and allow them to drop through said apertures, said plate having a portion thereof being disposed under said platform below said apertures enabling said punched-out articles to pass directly onto said trestles as they drop through said apertures.

16. The apparatus defined in claim 15, wherein said means for mounting said punched out articles on said trestles comprises axially movable sucking and guiding fingers extending vertically upwardly through said trestles, and means for axially shifting said fingers between upper and lower vertically spaced positions where said articles are respectively engaged and lowered into position on said trestles.

17. The apparatus defined in claim 16, wherein said fingers are operable to lift said punched-out articles off said trestles following engagement with said shaping tools.

18. The apparatus defined in claim 17, wherein each of said trestles is formed with a central vertical bore through which associated ones of said fingers extend.

19. The apparatus defined in claim 18, wherein said fingers each are formed with an upper tip shaped to conform to the contour of the part of the article engaged thereby.

20. In an apparatus for shaping a bead of rounded contour on the rounded rim portion formed on an outwardly and rearwardly flared skirt of a thin-walled plastic article, a shaping tool, a trestle adapted to mount the article whose rim portion is to be shaped and having a thrust surface adapted to bear against said article at its rounded rim portion, and means providing for displacement of said shaping tool relative to said trestle for engagement over the article on said trestle, said shaping tool having first and second heated die ring zones, said first heated die ring zone being operable to inwardly bend said outwardly flared skirt into a position where it is substantially perpendicular to its original flared position, said first heated die ring zone being formed with an inwardly frusto-conically tapered heated surface having a peripheral inlet region, said inlet region having a greater diameter of the outside diameter of said outwardly and rearwardly flared skirt and the outside diameter of the finished bead on the rim of said article, said second heated die ring zone having a curved surface operable to engage said skirt in said perpendicular position for forming a smooth finished bead of rounded contour thereon.

21. The apparatus defined in claim 20 wherein said shaping tool is provided with a further zone having a slightly conical deflecting and guiding surface.

References Cited in the file of this patent

UNITED STATES PATENTS

| | | |
|---|---|---|
| 1,124,360 | Tholl | Jan. 12, 1915 |
| 1,880,858 | Davis | Oct. 4, 1932 |
| 2,152,970 | Ness | Apr. 4, 1939 |
| 2,230,778 | Flores | Feb. 4, 1941 |
| 2,266,948 | Barbieri | Dec. 23, 1941 |
| 2,309,726 | Zalewski et al. | Feb. 2, 1943 |
| 2,366,728 | Handley | Jan. 9, 1945 |
| 2,408,019 | Goebel et al. | Sept. 4, 1946 |
| 2,521,387 | Maynard et al. | Sept. 5, 1950 |
| 2,521,388 | Maynard et al. | Sept. 5, 1950 |
| 2,917,783 | Olson et al. | Dec. 22, 1959 |
| 2,924,852 | Michalko | Feb. 16, 1960 |
| 2,929,491 | Candido | Mar. 22, 1960 |

FOREIGN PATENTS

| | | |
|---|---|---|
| 131,728 | Sweden | May 15, 1951 |